No. 655,744. Patented Aug. 14, 1900.
W. S. VALENTINE.
SYRINGE.
(Application filed Sept. 25, 1899.)
(No Model.)
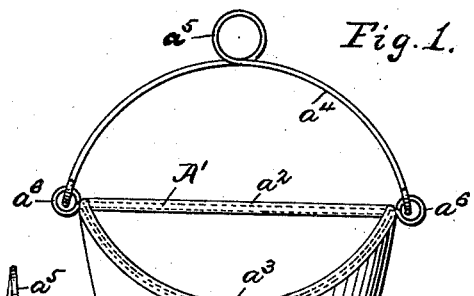
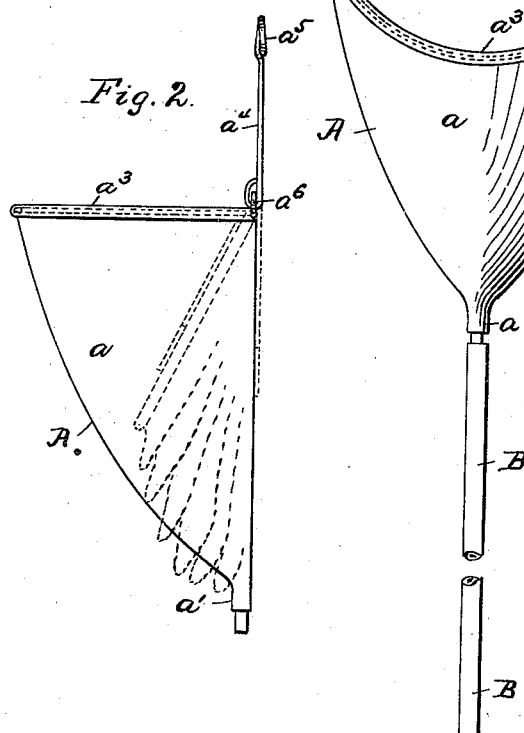
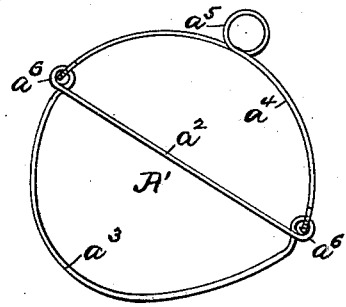
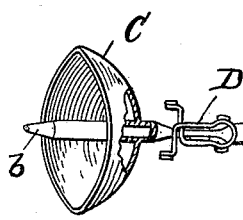
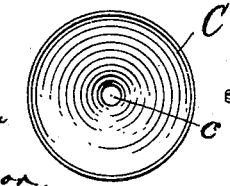
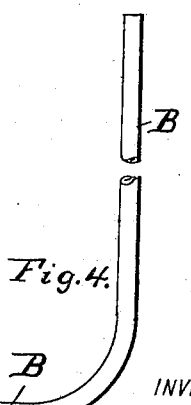
WITNESSES
INVENTOR
Washington S. Valentine,
BY
Arden S. Fitch,
ATTORNEY.

UNITED STATES PATENT OFFICE.

WASHINGTON S. VALENTINE, OF NEW YORK, N. Y.

SYRINGE.

SPECIFICATION forming part of Letters Patent No. 655,744, dated August 14, 1900.

Application filed September 25, 1899. Serial No. 731,573. (No model.)

*To all whom it may concern:*

Be it known that I, WASHINGTON S. VALENTINE, a citizen of the United States, and a resident of New York, in the county of New York and State of New York, have invented certain new and useful Improvements in Urethral and Vesical Irrigators, of which the following is a specification, reference being had to the accompanying drawings, forming part hereof.

My invention relates to an appliance for effecting the irrigation of the human urethra and bladder; and the object of my invention is to furnish such an appliance which may be employed by a patient with convenience, safety, and effectiveness for self-administration of such irrigation.

My invention consists in the combination, with a reservoir to hold the irrigation liquid, of a tube of soft flexible material, such as soft rubber, leading at one end from the discharge-aperture of said reservoir and having its circumferential wall at its opposite or free end convergent upon itself toward the longitudinal axial line of the tube and provided with an aperture at its extremity at said free end on said longitudinal axial line, together with an annular concavo-convex flange of soft flexible material, such as soft rubber, on the tube adjacent to and with its concave face extending toward and surrounding said apertured extremity of the free end thereof; and my invention comprises a reservoir for holding the irrigation liquid, composed of a bag of soft flexible material, such as soft rubber, provided with a discharge-aperture at its lower end and at its upward edge or rim with a rigid frame consisting of a wire inclosed in said upward edge or rim and comprising a section which describes a right line and a section which describes a curve from one end to the other of said right-line section and eyes projecting beyond said rim of the bag at the respective opposite ends of said right-line section, together with a bail or handle hinged to said eyes of said rigid frame, all substantially as hereinafter described and for the purposes hereinafter set forth.

In the drawings, Figure 1 is an elevation of an irrigation appliance containing my invention. Fig. 2 is a side elevation of the reservoir detached. Fig. 3 is a perspective view in detail of the rigid frame and its hinged bail for the upward edge of the reservoir; and Fig. 4 is an elevation, partly in section, at its contracted lower end of the flexible tube, the annular concavo-convex flange being detached. Fig. 5 is a front elevation of the soft flexible shield or flange detached from the tube.

A is the reservoir, which is preferably composed of a bag $a$ of soft flexible material, such as soft rubber, and desirably conical in form, with a discharge-aperture $a'$ at its apex or lower end. To the upward edge or rim of the mouth of this bag is secured, preferably by inclosure in a fold-over of said edge or rim, a rigid frame $A'$, one section $a^2$ of which describes a right line and the opposite section $a^3$ of which describes a curve between the respective ends of the said section $a^2$. A bail $a^4$, desirably furnished with an eye $a^5$, is hinged to eyes $a^6$ on the respective opposite ends of the section $a^2$ of the rigid frame, the said eyes $a^6$ projecting beyond the rim of the bag for this purpose. The frame is composed of wire, as shown in Fig. 3, bent upon itself to form the described sections $a^2$ and $a^3$ and the eyes $a^6$, and the bail is also composed of wire bent upon itself to form the loop or eye $a^5$ and at its ends to form loops to engage the frame-eyes $a^6$.

By means of the described frame $A'$ and its bail $a^4$ an inexpensive and effective device is provided by which the flexible bag $a$ may readily be suspended at a desired height and by which when the bag is suspended against a flat surface, such as a wall, with the section $a^2$ of the frame adjacent thereto, the tilting of the bag at its upward end or mouth by contact with the wall will be obviated, as illustrated in the position of the bag shown in Fig. 2, and also by which when the reservoir is not in use the bag may be collapsed upon itself and the frame folded down upon it, with the bail also folded down, as illustrated by the broken lines in said Fig. 2.

B is a tube of soft flexible material, such as soft rubber, and of any suitable length. One end of said tube is attachable to the discharge-aperture $a'$ of the reservoir A, while the circumferential wall of the tube at the opposite or free end thereof converges upon itself toward the longitudinal axial line of the tube, and the extremity of said free end at said axial line is provided with an aperture, thus constituting upon said end of the tube and integral with it a soft, flexible, and contracted delivery-nozzle b.

C is an annular concavo-convex flange of soft flexible material, such as soft rubber, which is mounted on the tube B, as by a central aperture c in said flange, through which the tube is passed to hold the flange on the tube by frictional contact, or, which is preferable, the said flange is formed on and integral with the wall of the tube and of the soft flexible material thereof, and said flange is located adjacent to said free end of the tube with its concave face extending toward and surrounding the said integral contracted extremity or nozzle b thereof.

At D is shown a clamp which is detachably mounted on the tube, preferably immediately behind the flange C, with the tube seated between its spring-actuated jaws and adapted to be manipulated to force the jaws apart to a greater or less degree for the purpose of regulating the flow of liquid from the reservoir through the tube to its delivery-nozzle b.

In an appliance of this class as at present constructed the tube B, although itself fabricated of flexible material, has had a delivery-nozzle and an annular concavo-convex flange surrounding the nozzle and commonly called a "shield" both formed of hard rigid material, the nozzle being usually of glass and the flange or shield of metal and both the shield and nozzle being detachable from the tube. Such an appliance is adapted and intended for use only by a skilled practitioner in administering treatment to a patient, the skill of the manipulator enabling him to apply the glass nozzle to and to hold the metal shield near the external orifice of the urethra without liability of injury to said orifice or thereby increasing the inflammation of the affected parts.

By means of my described tube B, of soft flexible material, such as soft rubber, as stated, with its wall contracted upon itself at the free end of the tube and having the described central aperture at its extremity, thus constituting a soft flexible delivery-nozzle on and integral with the tube, together with the described flange C, preferably integral with the tube and constituting a soft flexible shield for the said nozzle thereon, the appliance is especially adapted to be used by a patient for the self-administration of treatment without danger of inflicting injury upon the affected parts. Furthermore, the tube and its integral delivery-nozzle b and the flexible flange C are capable of sterilization all together by immersion in boiling water, while the entire appliance, including the described reservoir, is adapted to be conveniently portable.

What I claim as my invention, and desire to secure by Letters Patent, is—

1. In an appliance for urethral and vesical irrigation, the combination with a reservoir to hold the irrigation liquid, of a tube of soft rubber, connected at one end to said reservoir and having its circumferential wall at its opposite or free end convergent upon itself toward the longitudinal axial line of the tube and provided with an aperture in the extremity of said free end on said axial line, together with an annular concavo-convex flange of soft rubber, mounted on said tube adjacent to and with its concave face extending toward said contracted free end thereof, substantially as and for the purpose specified.

2. In an appliance for urethral and vesical irrigation, the combination with a reservoir to hold the irrigation liquid, of a tube of soft rubber, connected at one end to said reservoir and having its circumferential wall at its opposite or free end convergent upon itself toward the longitudinal axial line of the tube and provided with an aperture in the extremity of said free end on said axial line, together with an annular, concavo-convex flange on the tube, integral with its wall and adjacent to and with its concave face extending toward and surrounding said contracted free end thereof; substantially as and for the purpose specified.

3. In an appliance for urethral and vesical irrigation, a reservoir to hold the irrigation liquid composed of a bag of soft rubber, provided with a discharge-aperture at its lower end, and with a rigid frame inclosed in its upward edge or rim, consisting of a wire constituting a section which describes a right line, an opposite section which describes a curve between one end and the other of said right-line section and eyes at the respective ends of said right-line section projecting beyond the bag-rim, together with a bail or handle hinged to said eyes on said frame, and a flexible tube attached to and leading from the discharge-aperture of said bag; substantially as and for the purpose specified.

Signed at Puerto Cortio, in the Republic of Honduras, this 29th day of August, A. D. 1899.

WASHINGTON S. VALENTINE.

Witnesses:
J. M. DYER,
H. S. GIRLER.